(12) United States Patent
Sukman et al.

(10) Patent No.: US 9,173,489 B2
(45) Date of Patent: Nov. 3, 2015

(54) STORAGE RACK DIVIDER KIT AND APPARATUS

(71) Applicant: Milton Merl & Associates, Inc., Long Island City, NY (US)

(72) Inventors: Joel Sukman, Maspeth, NY (US); Robert Ernst Langelius, Jr., White Plains, NY (US)

(73) Assignee: Milton Mercy & Associates, Inc., Brooklyn, NY (US)

( * ) Notice: Subject to any disclaimer, the term of this patent is extended or adjusted under 35 U.S.C. 154(b) by 183 days.

(21) Appl. No.: 13/900,920

(22) Filed: May 23, 2013

(65) Prior Publication Data

US 2014/0346130 A1 Nov. 27, 2014

(51) Int. Cl.
*A47H 1/00* (2006.01)
*A47B 96/04* (2006.01)
*A47F 3/00* (2006.01)
*A47F 5/10* (2006.01)
*B65G 1/02* (2006.01)

(52) U.S. Cl.
CPC ............... *A47B 96/04* (2013.01); *A47F 3/004* (2013.01); *A47F 5/105* (2013.01); *B65G 1/02* (2013.01)

(58) Field of Classification Search
CPC ...... A47B 96/04; A47B 57/58; A47B 57/581; A47B 57/583; A47B 57/585; A47B 57/586; A47B 57/588; A47F 3/004; A47F 5/105; B65G 1/02; B60P 7/15; B60P 7/14; B60P 7/06; B61D 45/006

USPC .......................................................... 211/183
See application file for complete search history.

(56) References Cited

U.S. PATENT DOCUMENTS

| | | | | |
|---|---|---|---|---|
| 3,963,290 A | * | 6/1976 | Rennemann | 312/321 |
| 4,772,165 A | * | 9/1988 | Bartkus | 410/139 |
| 5,472,103 A | * | 12/1995 | Merl | 211/187 |
| 5,743,413 A | * | 4/1998 | Noll | 211/60.1 |
| 6,116,436 A | * | 9/2000 | Ferrucci et al. | 211/187 |
| 6,138,960 A | * | 10/2000 | Carbonare et al. | 248/62 |
| 6,460,710 B1 | * | 10/2002 | Dardashti | 211/184 |
| 6,672,546 B2 | * | 1/2004 | Calleja | 248/58 |
| 6,978,906 B2 | * | 12/2005 | Wishart et al. | 211/189 |
| 7,150,361 B2 | * | 12/2006 | Calleja | 211/49.1 |
| 2013/0306583 A1 | * | 11/2013 | Caldwell | 211/181.1 |

* cited by examiner

*Primary Examiner* — Korie H Chan
(74) *Attorney, Agent, or Firm* — Ladas & Parry LLP

(57) ABSTRACT

A divider kit for constructing and installing a divider system on a storage rack system of the type having a pair of parallel header elements at a top of a storage volume with a front-to-back depth and a side-to-side length to be divided by the assembled kit comprises components for constructing a plurality of main beams dimensioned to extend between and be supported upon the header elements in a spaced apart relationship and a pair of rails for mounting in a spaced relationship along the side-to-side length upon the main beams. The kit further comprises at least one u-shaped divider with two legs mountable upon the rails and depending therefrom to divide the storage volume into at least two sub-volumes. A variety of differently-sized divider systems may be assembled from the components.

14 Claims, 7 Drawing Sheets

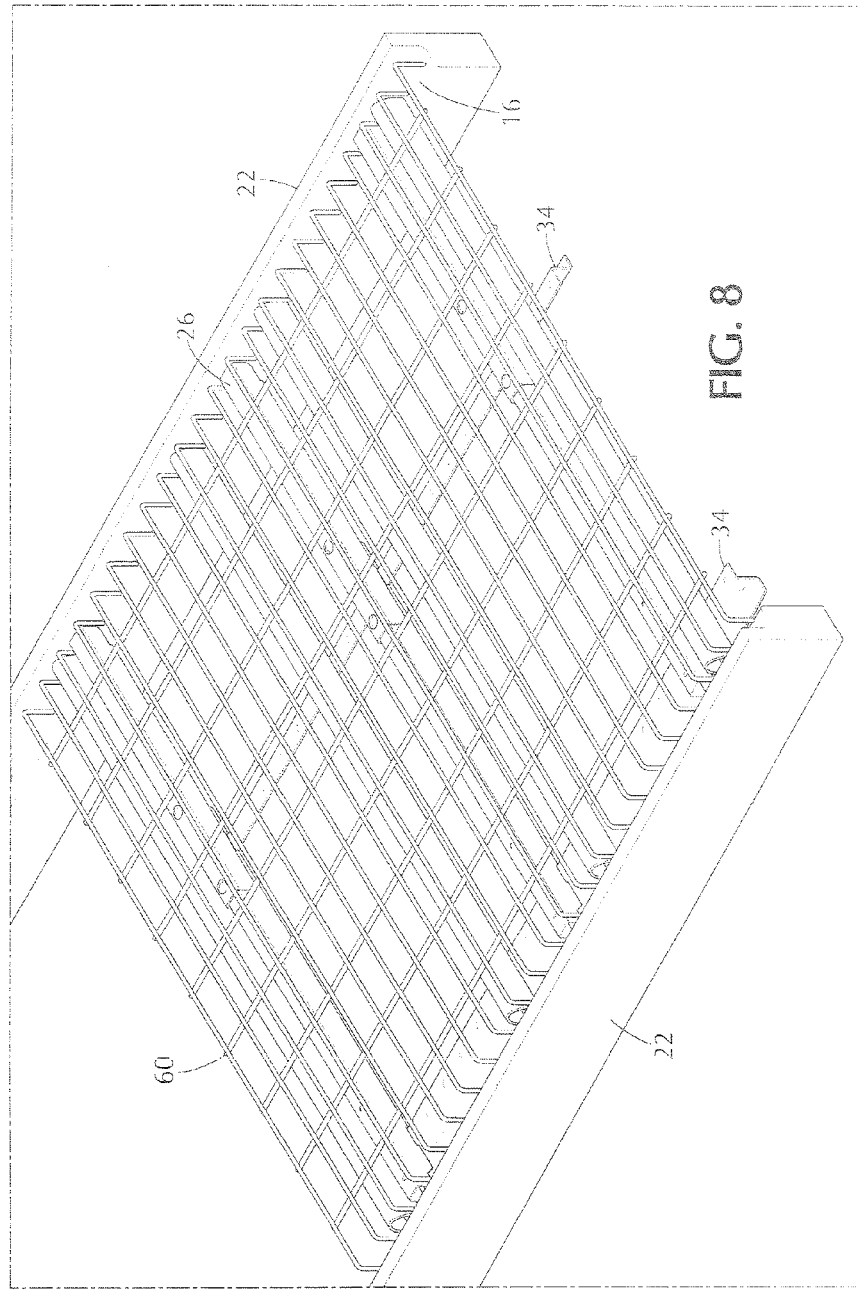

STORAGE RACK DIVIDER KIT AND APPARATUS

The present invention is directed to a new and improved divider construction and kit for compartmentalizing storage rack units of the general type used in warehouse and "big box" store environments.

BACKGROUND OF THE INVENTION

Rack type storage systems are prevalent in warehouses as well as in "big box" retail stores to store and display products. In a warehouse environment the racks are typically used to store large containers in which a plurality of products, packaged or unpackaged, have been delivered to the facility, while in retail stores the racks are used both for the storage of bulk packed containers as well as for the display of individual packages, maintaining a "warehouse look" for the retail shelves. Such rack storage systems are economical to build and install, and provide wide expanses of open shelving space, allowing packaging containers of numerous sizes to be easily accommodated in a variety of arrangements.

Typically, store inventory placed before the shopping public is laid out through a "planogram" system, in which the layout of the shelving and the proposed arrangement of goods on the shelves is depicted graphically to allow a decision to be made for purposes of best presenting the products and to assist store personnel in setting up the shelving in accordance with the designed arrangement. A very feature of storage rack shelving that allows accommodation of large quantities of various products—the absence of means for dividing the shelf expanses into sub-units—can make it difficult or organize and segregate the products stored on the shelves and thus hinders execution of planogrammed product placement and display, in which each item has a particular location and amount of shelf space for its placement. Store personnel are often left to their own devices in deciding precisely where to load product on the racks, and products can be intermingled. Likewise in a warehouse environment, rather than stacking products in an orderly fashion, a particular product can be spread across a relatively wide expanse of shelving, limiting availability for other products and making inventorying of product more difficult. In a retail environment, whether planogrammed or not, a lack of means for dividing the shelving into segments can also inhibit effective restocking, and can make it more difficult for a customer to locate and retrieve a particular product.

It is accordingly a purpose of the present invention to provide a divider system in the form of a kit that can be installed on rack type storage systems to sub-divide rack shelving into discrete sub-units in accordance with the desires of the user, A further purpose of the present invention is to provide such a kit that can be used in connection with rack systems of varying dimensions.

Yet a further purpose of the present invention is to provide such a kit that is of economical construction, that is easy to install, which provides flexibility in assembly are arrangement, and which can be boxed and stored in a relatively small volume.

BRIEF DESCRIPTION OF THE INVENTION

In accordance with the above and other objects and purposes, a divider kit in accordance with the invention comprises frame components that are assembled to provide a hanger frame that extends from front to back of a rack storage system, above a shelf to be divided, and which extends along a desired length of the shelf. Preferably the frame is supported on the rack system in the same manner that the shelves themselves are supported. One or more depending divider brackets are provided to be mounted to the hanger frame, and extend across a portion of the depth of the shelf, dividing the shelf area into sub-units. The divider brackets may be positioned anywhere along the hanger frame, allowing the shelf area to be sub-divided in full accordance with the needs of the user. When the shelf or rack area is planogrammed, the dividers can be easily positioned in accordance with the designed layout, allowing the planogram to be efficiently implemented.

In a preferred aspect of the invention, the hanger frame is not permanently attached to rack system, allowing it to be mounted without the need for exotic tools or special fasteners, further allowing it to be disassembled and reassembled in another configuration, or to be removed and used in another location as may be desired. In a likewise manner the divider brackets are not permanently affixed to the hanger frame, allowing them to be moved along the hanger system as may be needed to accommodate differing inventory loads and planogram layouts.

BRIEF DESCRIPTION OF THE DRAWINGS

A fuller understanding of the present invention will be achieved upon consideration of the following description of an illustrative embodiment thereof, when reviewed in association with the annexed drawings, wherein:

FIG. 8 depicts a frame in place with an overlaid rack floor.

DETAILED DESCRIPTION OF AN EMBODIMENT OF THE INVENTION

Figure 1:
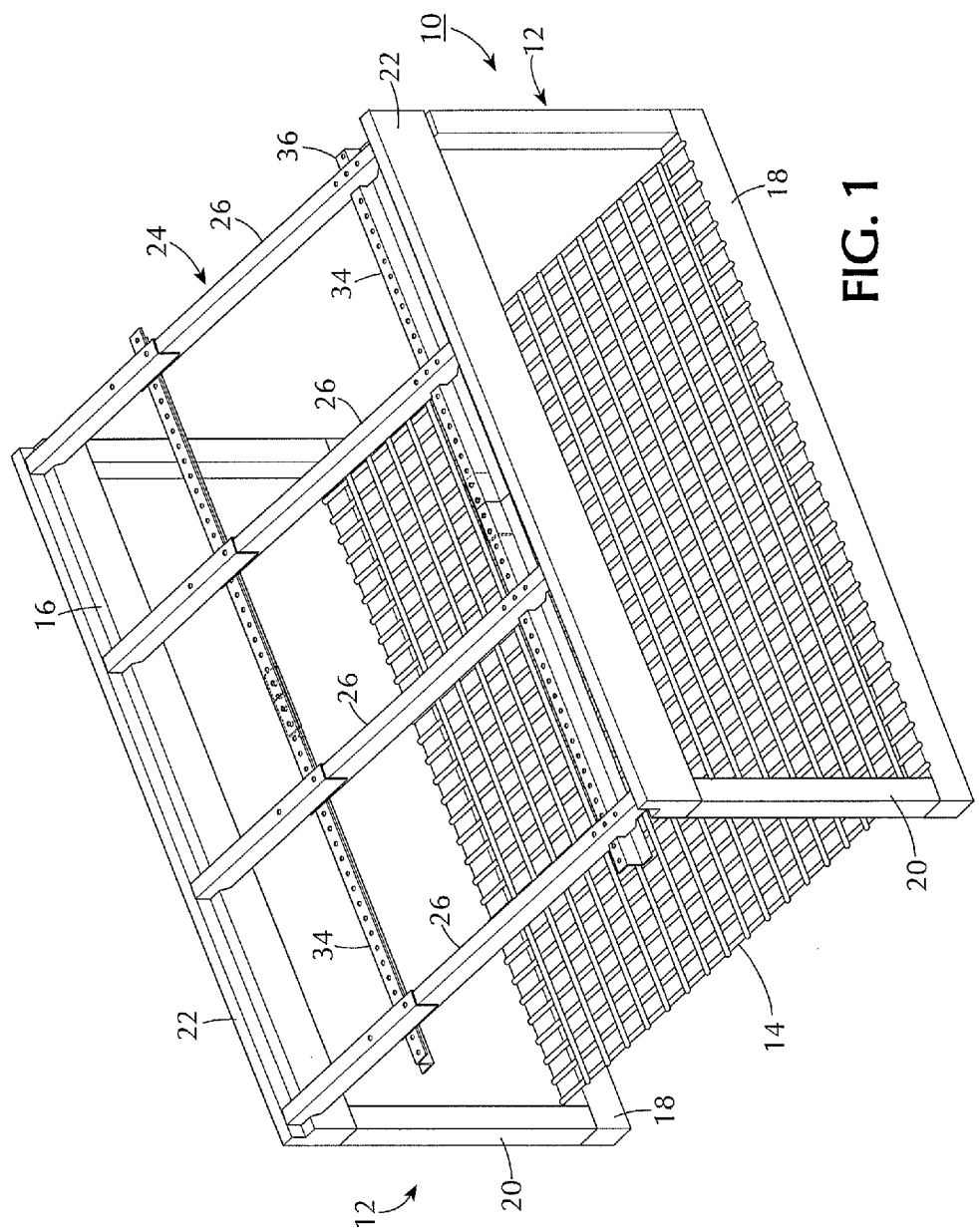
FIG. 1 is a perspective view of a typical storage rack with which the invention can be employed, showing a hanger frame of the present invention in place thereon.

FIG. 1 illustrates a representative section of a conventional rack system. As may be appreciated, a complete rack system as employed in a warehouse or other facility may comprise a plurality of the sections depicted in side-by-side relationship. Multiple sections may also be stacked on each other to provide a rack system of substantial height as well as length. As depicted in the figure, such a conventional rack system 10 comprises front and rear side frames 12 adapted to support shelving 14 therebetween. The frames each comprise a floor beam 18, a pair of uprights 20, and a header. The shelving may be in the form of an open metal gridwork, as shown, but other materials, such as plywood or sheet metal, can also be employed. The front and rear edges of the shelving typically rest on the tops of the longitudinal frame floor beams 18 or on beam ledges.

The present invention comprises a hanger frame 24, which is supported above the shelf 14 intended to be divided by the rack system's frame's front and rear headers 22, which in turn are supported by the rack system's front and rear uprights 20. The headers generally define the useful height of a storage area for the section of the rack, while the uprights 20 roughly define the sideways width of the storage area. As the length of the floor beams and headers may be upwards of 10 feet, with the uprights positioned at the ends thereof, the space of the storage section so bounded may be substantial, requiring the use of the present invention to sub-divide the space into smaller, more useful volumes, As further depicted in FIG. 1, hanger frame 24 of the present invention comprises a series of lateral beams or connectors 26 which extend between, and are supported by, the rack system's headers 22, which may have inward-facing ledges 16 on which the beams rest. The beams support a pair of transverse rails 34. The components comprising the beams and rails, and thus from which the hanger frame is assembled, are individually depicted in FIG. 2.

Figure 2:
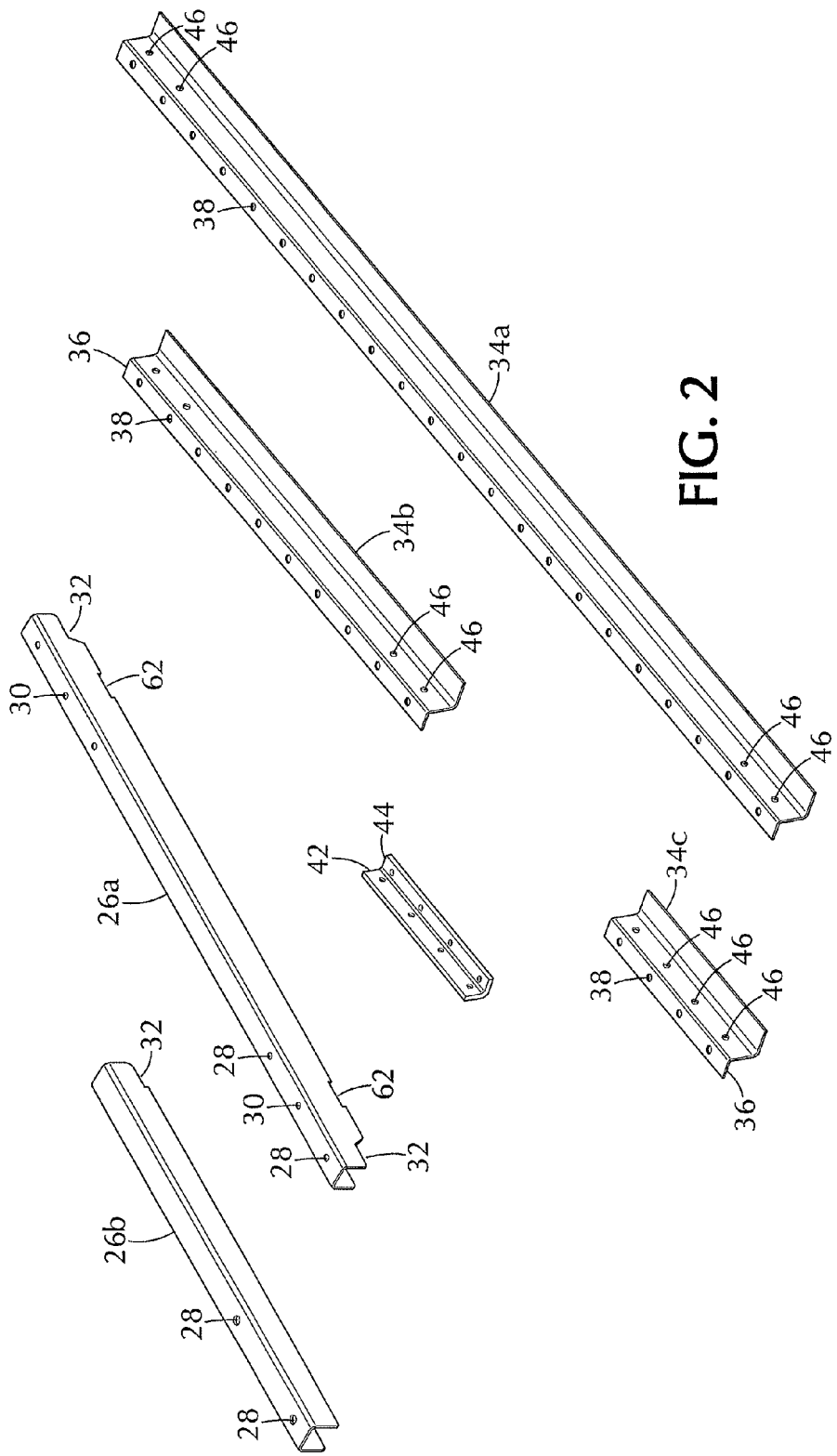
FIG. 2 is a perspective view of the kit components associated with the hanger frame of the invention.
Figure 6:
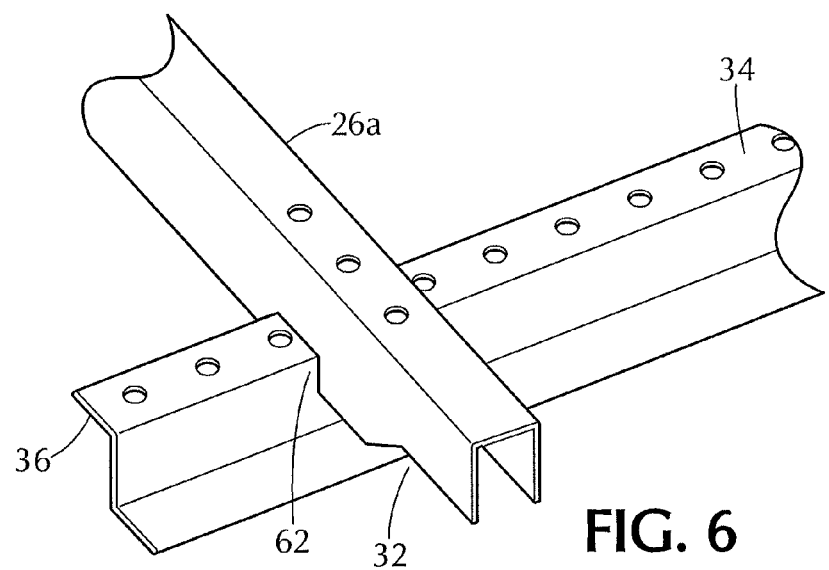
FIG. 6 is a detail view of the interconnection of elements forming the hanger frame.

With further reference to FIG. 2, as rack systems may be of various front-to-back depths, the beams 26 may be formed of either a single, main element 26*a*, or for greater depths, formed of a main element 26*a* and an extender element 26*b*. Both elements are of an inverted U profile, with the extender element's profile dimensioned to fit closely over and upon the main element 26*a*. Bores 30 are provided on the top portions of the main element 26, allowing the beams to be interconnected with the rails 34, while aligned pairs of bores 28 on both elements 26*a* and 26*b* allow the respective elements to be bolted or otherwise joined together by appropriate fasteners (not shown). The main element 26*a* may be about 27.5 inches long, chosen to span the corresponding mounting distance of a first commonly provided 31 inch deep rack system, while the extender 26*b* may have an overall length of 20 inches, allowing the assembled beam to extend across a second common mounting distance of about 38.5 inches associated with a 42 inch deep rack. The ends of the beam elements may have notched leg ends 32 (see also FIG. 6) to rest upon the headers and to ensure that the top surface of the beam is coplanar with or slightly below the top surface of the header 22 on which it rests, although the beams may also be configured to rest upon the top surface of the header As further depicted in FIG. 8, the beam ends allow a shelf 60, shown here as being in the form of an open grid with depending front and rear edges, to be placed on ledges 16 of the headers to support a second level of product without interference from the beams.

Again referring to FIG. 1, the front and rear frame rails 34 are mounted to and are supported by the beams 26. The rails may be formed from Z profile stock, see FIGS. 2 and 7, and run longitudinally along the length of the rack system space to be subdivided. The top arms 36 of the rails are provided with a series of spaced bores 38, allowing the rails to be mounted to the beams 26 with a bore 38 aligned with a corresponding beam bore 30. Preferably, the beam bores 30 may be threaded to engage the threads of appropriate short bolts inserted upwardly through the aligned rail bore, the lengths of the bolts being chosen such that when threaded into the beam bores they do not contact with an extender 26*b* that may overlie the main beam in the connection area. As may be seen in FIGS. 1 and 2, a pair of mounting bores 30 may be located on proximate the ends of a main beam element 26*a* such that a front rail 34 will be located close to the front end of the beam, while a rear rail 34 is mounted appropriately to properly space the rails apart to accept the dividers, as will be further discussed infra. To insure that the front and rear rails are properly spaced from each other, and to assist in their positioning, the beam elements 26*a* may be provided with notched portions 62, best seen in FIGS. 2 and 6, aligned with the bores 30, to accept the transversely positioned rails 34.

Figure 7:
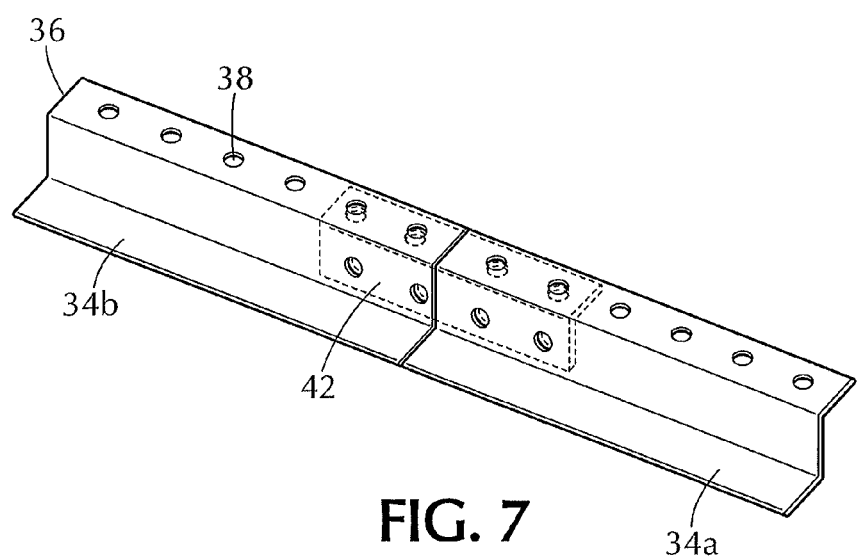
FIG. 7 is a perspective detail view of the joining of a pair of rail elements.

To allow hanger frames of the invention to be installed on rack system sections of a variety of lengths, the frame kit may be conveniently provided with rail elements in three lengths, as shown in FIG. 2, with joiner elements being provided to allow the individual rail elements to be interconnected. A typical kit of frame components may include main rail elements 34*a*, which may be 44 inches in length, along with extension elements 34*b* in 20 inch lengths and 34*c* in 8 inch lengths, along with joiners 42, of a right angle profile, to allow joining of an extension element to a main rail element. Rail elements 34*a*, 34*b* and 34*c* are all provided with pairs of bores 46 at the ends of their central panels, typically aligned with the top arm bores 38, while joiner 42 is provided with similarly spaced bores 44 on both arms to align with the rail top arm bores 38 and the central panel bores 46 of the two abutting rail elements to be joined. Preferably the joiner bores are threaded to accept mating bolts inserted through the corresponding aligned rail element bores. FIG. 7 illustrates how joiner 42 is used to connect abutting rail elements, such as 34*a* and 34*b*, together, with bolts (not shown) being inserted through the rail bores into the aligned threaded bores in the joiner. The provision of the size rail elements listed above allows frames to be easily constricted for use on commonly utilized 4, 8, 9 and 11 foot long racks. To adequately support the rails, frame beams 26 may be on 12, 16 or 18 inch center spacing along the length of the shelving.

Figure 3:
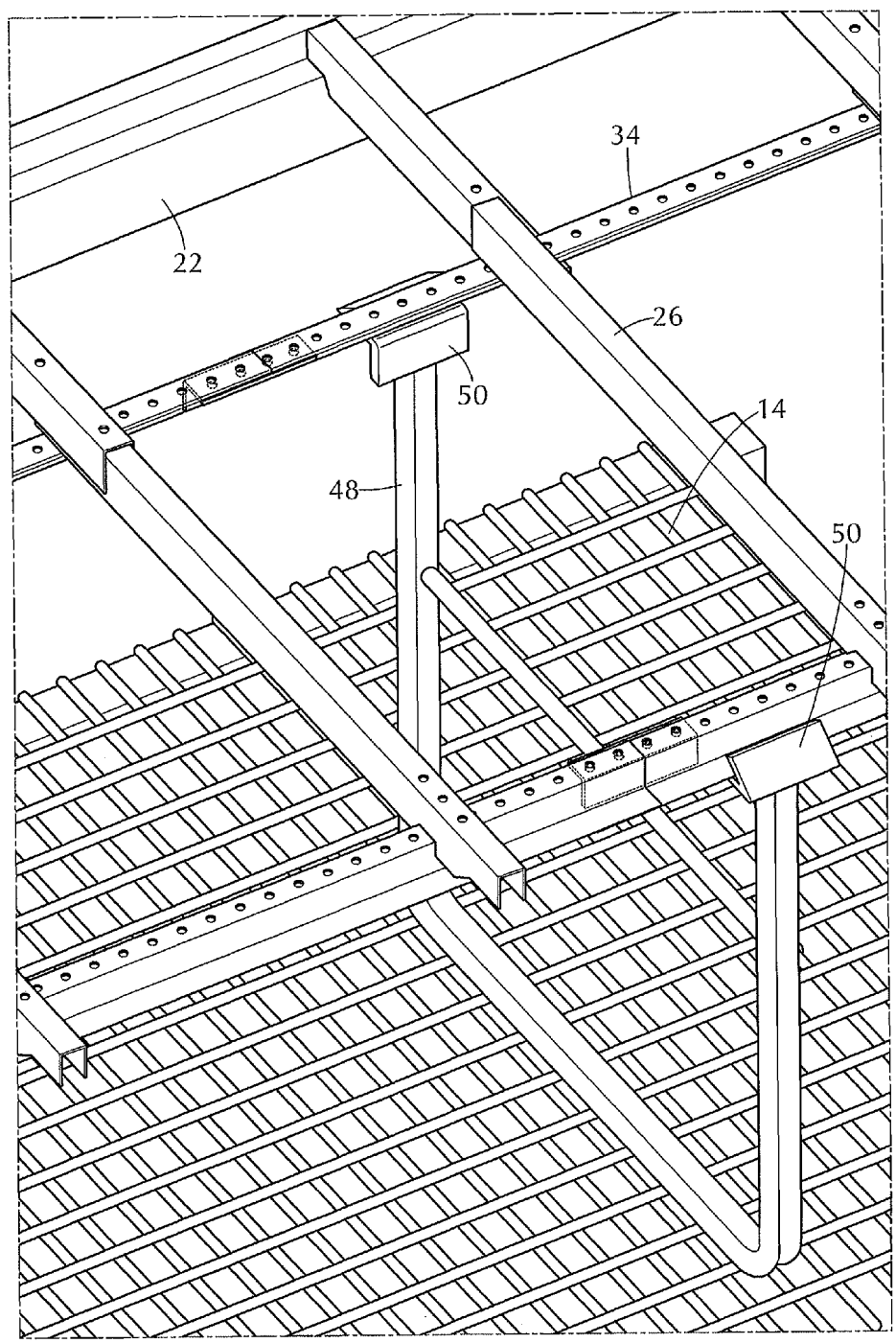
FIG. 3 is a detail view of a portion of the hanger frame in place on a storage rack, showing a divider bracket mounted thereto.
Figure 4:
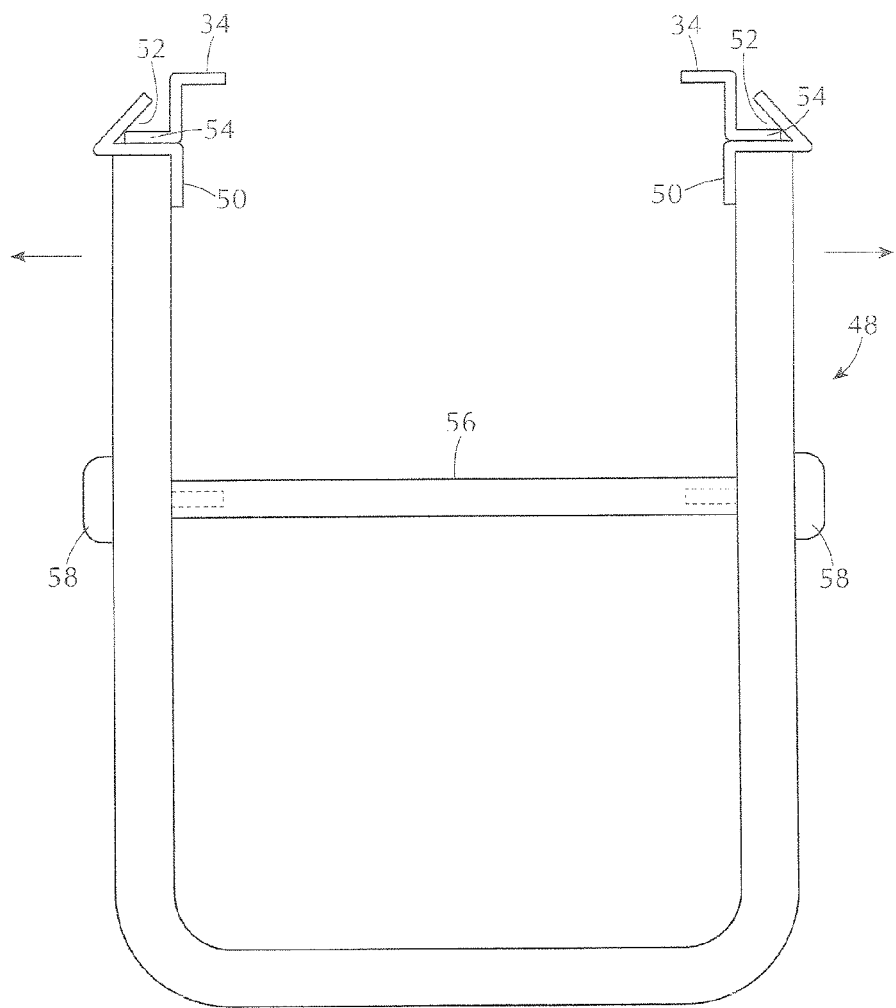
FIG. 4 is amide elevation view of a divider bracket.
Figure 5:
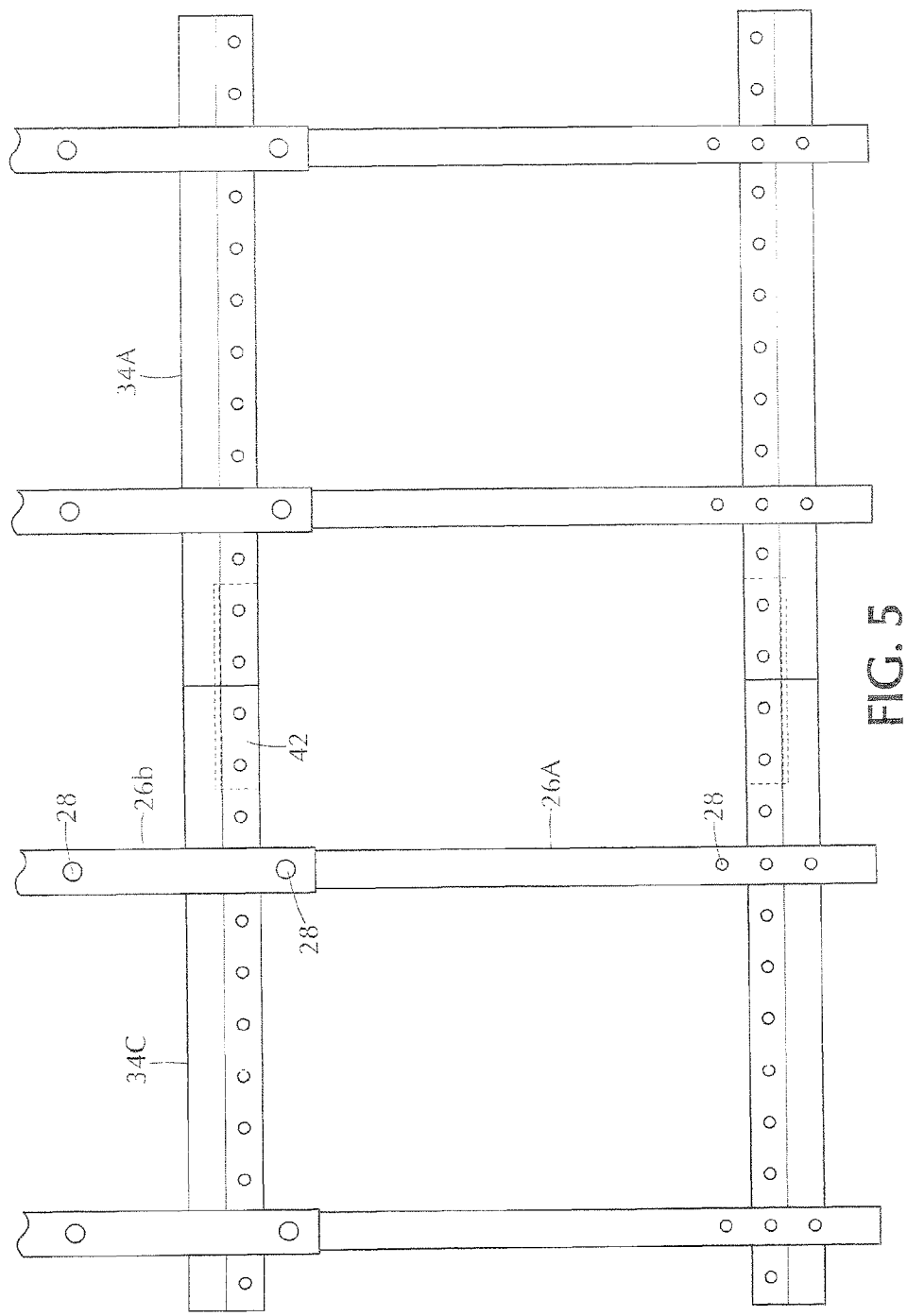
FIG. 5 is a plan view of a portion of an assembled hanger frame.

The rails 34 of an assembled frame, placed in position on a rack as shown in FIG. 1, support one or more dividers 48, as shown in FIGS. 3 and 4. The divider is U-shaped, with a height chosen that it extends downwardly to a position slightly above the shelf to be divided. Hook members 50 are located at the upper ends of the divider to engage the rails 34. As may be seen, the hook members 50 are each formed with an acute angle bend 52 between two arms into which the horizontally extending bottom (ledge) arm portion 54 of a rail 34 is inserted. The hook arms forming the angle 52 capture the arm 54 and support the divider upon the rails.

As may be seen in the figures, the rails 34 are mounted to the beams 26 such that the rail bottom ledge arms 54 face outwardly, away from each other, while the two hook members 50 of a divider have their acute angles 52 facing inward, towards each other, The divider body, which may be formed of tubular metal, has sufficient flex to allow a installer of the divider on the rails to flex the upper ends of the vertical arms of the divider outwardly from each other, as shown by the arrows in FIG. 4, to allow the rail ledge arms to be positioned within the angles 52 and be captured therein when the flexing force on the arms is relieved. Cross member 56, retained between the divider arms by bolts 58 passing through the arms and engaging threaded end bores in the cross member, is loosened for mounting of the divider, allowing the arms to be flexed apart as needed, With the divider mounted on the rails, it may be slid along the rails as desired for final positioning. The cross member 56 is of a length chosen such that, once the divider is in its desired position and cross member bolts 58 tightened, the divider arms are drawn together, prevented from further outward flexure, securely wedging the rail ledge arms within the hook members 50, ensuring that the divider remains mounted to the rails and preventing the divider from movement along the rails.

A kit of components will normally contain a plurality of main beam and extender elements, a plurality or rail elements and joiners, and a plurality of dividers, along with the necessary hardware to connect the elements together in appropriate configurations for one or more planogrammed shelf areas. A hanger frame is assembled and placed in position on the storage rack, and the dividers are then mounted to the rails, slid into position, and tightened in place. If the dividers need to be repositioned, they are easily loosened and slid to the new positions (or removed if required). Likewise, an assembled hanger frame can easily be removed from a storage rack and disassembled such that the components can be reassembled in a different configuration as may be desired, All the divider system components may be economically fabricated from appropriate materials, typical metal such as aluminum or steel of a gauge as may be dictated by the lengths of the members and the strength required.

We claim:

1. A divider kit for installation on a previously installed storage rack system of the type having a shelf and a pair of horizontal longitudinal parallel header elements spaced above the shelf defining a top of a storage volume extending above the shelf, the divider kit dividing the storage volume between the shelf and the header elements into sub-volumes when assembled and comprising:
   a hanger frame comprising a pair of main beams dimensioned and constructed to extend laterally between and be removably supported upon the header elements above the shelf in a chosen spaced apart relationship and a pair of rails for removable mounting in a horizontal longitudinal spaced relationship supported solely upon the main beams; and
   a u-shaped divider with two legs removably mountable upon the rails and depending downwardly therefrom to divide the storage volume into two sub-volumes.

2. The divider kit of claim 1 wherein at least one of the main beams comprises first and second beam elements and a joiner element for interconnecting the first and second beam elements.

3. The divider kit of claim 1 wherein at least one of the main beams has a notched end forming a recessed portion for resting upon a horizontal ledge of one of the header elements.

4. The divider kit of claim 1 wherein at least one of the main beams has at least one downwardly directed notch to accommodate one of the rails.

5. The divider kit of claim 1 wherein at least one of the rails comprises first and second rail elements and a joiner for interconnecting the first and second rail elements.

6. The divider kit of claim 1 wherein each of the rails has a ledge portion and the legs of the u-shaped divider have mounts for sliding engagement with the ledge portion.

7. The divider kit of claim 6 wherein each mount has two arms forming an acute angle therebetween for receipt of a ledge portion.

8. The divider kit of claim 5 wherein the divider legs are flexibly deformable in directions away from each other.

9. The divider kit of claim 8 wherein the divider further comprises a bar mounted between the legs for releasably retaining the legs in a fixed position with respect to each other.

10. The divider kit of claim 9 wherein the bar is mounted to the legs by bolts threadedly engaging the bar.

11. A divider construction for installation on an installed storage rack system of the type having a shelf and a pair of horizontal longitudinal parallel header elements spaced above the shelf and defining a top of a storage volume between the shelf and the header elements, the divider construction comprising:
    a hanger frame comprising a pair of main beams adapted and constructed to extend laterally between and be removably supported upon the header elements above the shelf in a spaced apart relationship and a pair of rails removably mounted in a spaced horizontal relationship transverse to and upon the main beams; and
    a u-shaped divider with two legs removably mounted upon the rails and depending downwardly therefrom to divide the storage volume into two sub-volumes.

12. The divider construction of claim 11 wherein at least one of the main beams and rails are formed from a plurality of elements joined together at ends with a joiner element.

13. The divider construction of claim 11 wherein the rails have ledge portions and the legs of the u-shaped divider have mounts for sliding engagement with the ledge portions, the mounts having two arms forming an acute angle therebetween for receipt of a ledge portion.

14. The divider construction of claim 13 wherein the divider legs are flexibly deformable in directions away from each other, the divider further comprising a bar mounted between the legs for releasably retaining the legs in a fixed position with respect to each other.

* * * * *